Feb. 23, 1954
C. R. DUNCAN
2,669,883
BRAKE LEVER ASSEMBLY
Filed Jan. 31, 1951
2 Sheets-Sheet 1
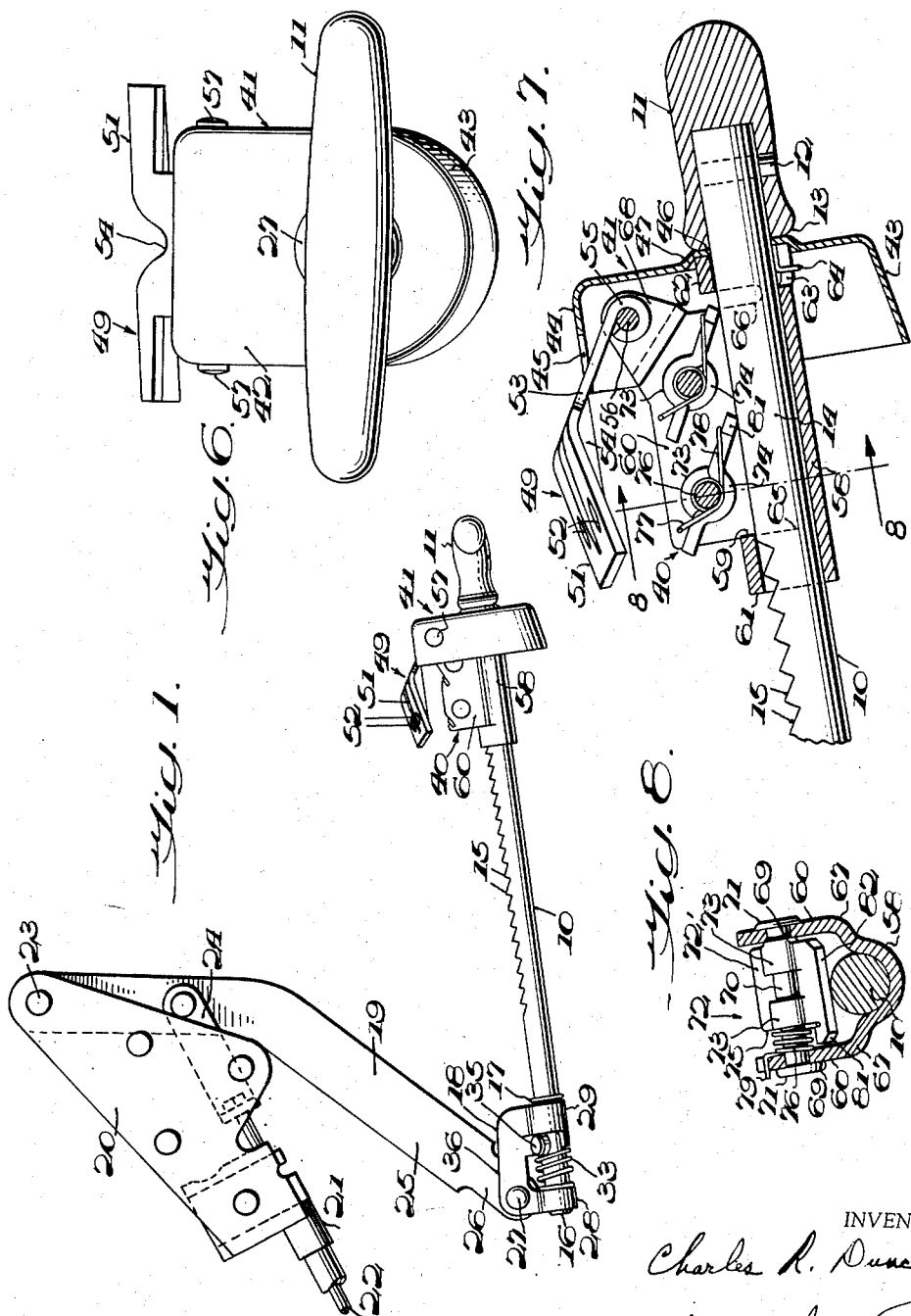
INVENTOR
Charles R. Duncan
BY
George Rex Frye
ATTORNEY Feb. 23, 1954
C. R. DUNCAN
2,669,883
BRAKE LEVER ASSEMBLY
Filed Jan. 31, 1951
2 Sheets-Sheet 2
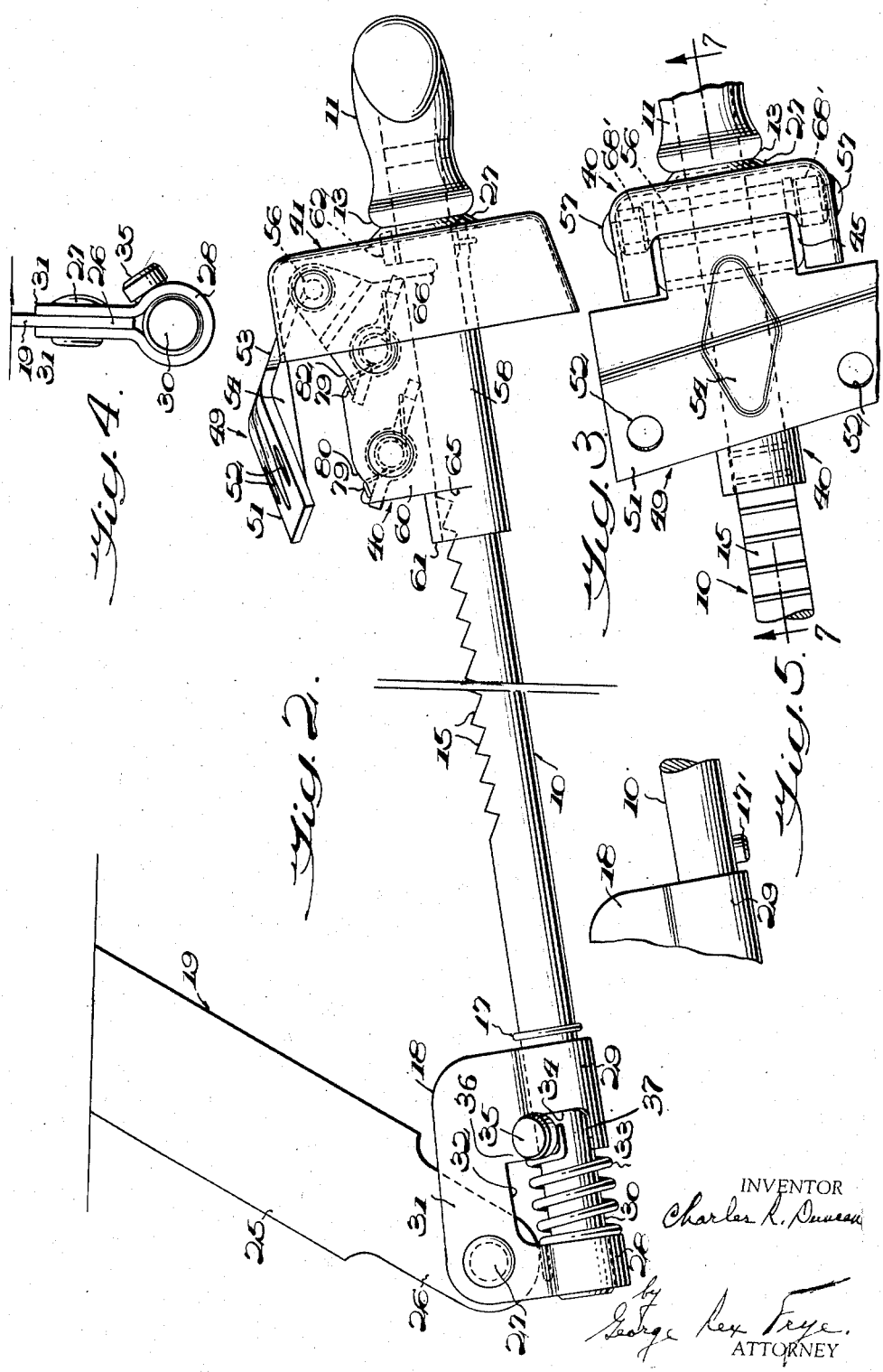
INVENTOR
Charles R. Duncan
by George Rex Frye.
ATTORNEY Patented Feb. 23, 1954

2,669,883

UNITED STATES PATENT OFFICE 2,669,883

BRAKE LEVER ASSEMBLY

Charles R. Duncan, Detroit, Mich., assignor to American Forging & Socket Company, Pontiac, Mich., a corporation of Michigan Application January 31, 1951, Serial No. 208,762

1 Claim. (Cl. 74—503)

This invention relates to improvements in brake lever assemblies of the straight-pull type. The primary object of the invention being to simplify the manufacture and assembling of component parts thereof, while at the same time rendering such parts readily susceptible of being assembled with or mounted on the component parts with which they are associated, in different positions, whereby the brake assemblies are rendered more versatile in adaptability to different situations.

An important object of the invention is to provide a one-piece frame, which can be a stamping, to serve as a guide for the pull rod and as a support for the pull rod and for a double pawl arrangement, and wherein the pawls can be located or selectively positioned above, below, or at either side of the pull rod.

Another object of the invention is to provide a one-piece stamped pawl which is embossed to form holding means.

Another important object of the invention is to provide a one-piece frame and a double pawl arrangement wherein the pivoted centers of the pawls can be easily located relative to the pull rod to increase or decrease tooth interference with respect to the ratchet teeth of the pull rod, and wherein a simplified mounting for the pawl springs is provided.

A further important object of the invention is to provide a simplified form and arrangement of the bracket which pivotally connects the pull rod with the brake lever, wherein only one assembling rivet is required and wherein such rivet serves also as a rotation stop for the pull rod when rotated by the torque spring or by hand.

Other important objects and advantageous features of the invention will be apparent from the following description and the accompanying drawings, wherein, merely for purposes of illustration, specific embodiments of the invention are shown in detail.

In the drawings, wherein the numerals designate like parts throughout the several views:

Figure 1 is a side elevation of a brake assembly in accordance with the present invention.

Figure 2 is an enlarged fragmentary side elevation, with internal structure shown in dotted lines.

Figure 3 is a fragmentary top plan view of a portion of Fig. 2.

Figure 4 is a fragmentary front end elevation of Figure 2.

Figure 5 is a fragmentary side elevation of an alternative form of rotation stop.

Figure 6 is a rear end elevation of Figure 2.

Figure 7 is a fragmentary vertical longitudinal section taken on the line 7—7 through Figure 3; and Figure 8 is a transverse vertical section taken on the line 8—8 through Figure 7.

Referring in detail to the drawings, the illustrated brake assembly comprises the straight round pull rod 10 having a handle 11 telescoped on its rear end and secured by a key 12, the forward end of the handle providing a stop shoulder 13 limiting forward movement of the pull-rod 10. A smooth unindented rear end portion 14 is provided on the rod 10 and a toothed portion having forwardly facing ratchet teeth 15 extends forwardly from the smooth portion 14 for the required distance. At a point adjacent to but spaced from its forward end 16 the rod 10 has an annular stop collar 17 or alternately a radial stop lug or piece 17', as shown in Figures 2 and 5, respectively, for engagement with the rear end of the connector bracket 18 which connects the forward end of the pull rod 10 with the lower end of the brake lever 19. The form and mounting of the lever 19 can vary but is here shown as involving a stationary mounting plate or bracket 20 having a guide or holder 21 at its lower end for the brake cable or rod 22 and a pivot 23 near its upper end on which the upper end of the lever 19 is pivoted, with the clevis 24 of the brake cable pivoted to the lever 19 below this point. The lower forwardly declining portion 25 of the lever 19 terminates in a flat lower end 26 which is traversed by a pivot pin 27 by means of which the lever 19 is connected to the connector bracket 18.

The connector bracket 18, which constitutes an important aspect of the present invention, consists of a single piece of sheet metal, which can be a stamping, formed to provide forward and rearward, axially aligned substantially cylindrical portions 28 and 29, respectively, which serve as journals for the smooth forward end portion 30 of the pull rod 10 extending between the stop 17 or 17' and its forward end 16. As best shown in Figures 2 and 4, the journal portions 28 and 29 are spaced and connected by a pair of flat, wing or flange portions 31 which extend radially from the journal portions 28 and 29, are longitudinally elongated, and are in parallel spaced relation at a distance to closely receive therebetween the flat lower end 26 of the brake lever 19, with the pivot pin 27 traversing the wings at a point adjacent to their forward ends.

The laterally inward edges of the wing portions 31 are cut away between the journal portions 28 and 29, as indicated at 32, to provide ample clearance with the rod portion 30, and the helical torque spring 33 which is circumposed on the rod portion 30 and compressed by and between the facing ends of the journal portions 28 and 29. Opposite ends of the torque spring 33 respectively engage the connector bracket 18 and rod 10 to bias pull rod 10 for rotation on its axis in one direction. Preferably the spring 33 is provided with arms on its opposite ends, one of which engages the connector bracket and the other engages the stop lug or pin 35 which projects radially from the pull rod 10.

As shown in Figure 2, the journal portion 29 of the connector bracket 18 is longer than the other journal portion, and is formed in its forward end with a notch or forwardly opening, circumferentially extending slot 34 serving as a guide for the rotation stop lug or pin 35 which projects radially from the rod portion 30 at this point. The opposite ends 36 and 37 of the slot 34 act as stops for engagement by the lug 35 and limit rotation of the pull rod 10 in opposite directions. It will be observed that the presence of the stop collar 17 at the rearward end of the bracket 18 maintains the rotation stop pin or lug 35 in place in the slot 34, and, that this arrangement serves additionally to keep the bracket 18 in place on the pull rod without additional means being required. It will also be noted that the pivot pin 27 which is riveted at its ends against the outer sides of the wings 31 is the only means required to assemble the bracket 18 together and at the same time serves to pivotally connect the bracket 18 to the brake lever 19.

The pull rod 10 is operatively supported at its rearward end by the bracket 40 which constitutes a combined guide for the pull rod and a frame for the ratchet pawls, and in conjunction with a mounting bracket, serves as a support for the pull rod 10. As shown particularly well in Figures 7 and 8, there is associated with the bracket 40 a combined cover and bracket component 41 comprising a vertical rear wall 42 having a rounded lower end, and a forwardly projecting peripheral flange 43 which extends around the edges of the wall 42. The upper, horizontal part 44 of the flange 43 is formed with a slot 45 which opens through its forward edge. The rear wall 42 is formed with a central opening 46 slidably accommodating the rear smooth portion 14 of the rod 10. The metal of wall 42 around the hole 46 is rearwardly offset, as indicated at 47, to provide a stop for the forward end 13 of the handle 11, and to provide an annular seat in the forward side of the wall 42, for a purpose hereinafter described.

The cover 41 is pivotally supported upon a mounting arm 49 adapted to be secured by bolts (not shown) to the lower flange on a conventional instrument panel (not shown), and the combined ratchet support frame and rod guide 40 is also pivotally and supportably connected to the bracket arm 49 by the same pivot pin 56 whereby the rear end portion of the rod 10 is effectively supported to swing beneath an instrument panel.

The mounting arm 49 is preferably a flat, one-piece stamping involving a relatively wide, transversely elongated forward part 51 reaching beyond opposite sides of the cover 41 (Figure 6) and provided near its lateral extremities with bolt holes 52 for accommodating attaching bolts (not shown). On the rearward edge of the part 51 is formed the rearwardly declining part 53 which is narrower than the cover and loosely fits in the slot 45 in the upper flange portion 44 of the cover, as shown in Figure 3. A diagonal bracing web 54 may be formed in the parts 51 and 53 and extends therebetween for mutual strengthening.

As shown in Figures 2 and 7 the declining part 53 of the bracket arm 49 extends through the cover slot 45 and has its lower extremity positioned within the upper part of the cover 41 above the rod 10, such forward extremity 55 for a horizontal transverse journal 55 being shown as forming a transverse pivot pin 56 which extends through the side portions of the flange 43 of the cover 41, the outer ends of the pin 56 being preferably riveted against the outer sides of the cover, as indicated at 57. By this arrangement the cover 41 and mounting arm are articulated relative to each other to enable and facilitate installation on automobiles of varying structures.

The pivot pin 56 also constitutes the principal mounting for the rod guide and ratchet pawl carrier frame 40 which preferably consists of a one-piece stamping of sheet metal formed to provide an elongated trough shaped pull rod guide portion 58 having a longitudinally elongated upwardly opening slot 59 (Figures 7 and 8) and laterally spaced upstanding parallel ratchet pawl carrying wings 60 rising from the side edges of the slot 59. The opposite ends of the slot 59 terminate short of the corresponding ends of the tubular portion 58 to define forward and rearward cylindrical end portions 61 and 62, respectively. The underpart of the rearward cylindrical end portion 62 is formed with a longitudinal slot 63 opening through its rearward end and accommodating a guide key 64 extending forwardly from the cover member 41 (Figure 7). Rear end portion 62 enters the annular seat surrounding opening 46 in cover member 41 and reinforces such seat adjacent its place of contact by handle 11.

As indicated in dotted lines in Figure 7, the side walls of the rod guide portion 58 are vertically slotted at the opposite ends of the wings 60, as indicated at 65 and 66, and the wings 60 and adjacent portions 67 are laterally displaced, as shown in Figure 8, beyond the sides of the rod guide portion 58. On the rearward ends of the wings 60 are ears 68 which extend rearwardly from and above the upper rear corners of the wings 60 and are formed with holes receiving the pivot pin 56 whereby the frame 50 is pivotally mounted on the mounting arm 49 through the same pivot pin as the cover 41. The ears 68 are spaced from the side portions of the cover flange 43 from which they are separated by spacers 68' (Figure 3) and engage the ends of the journal 55 on the mounting arm 49.

The wings 60 are formed with pairs of longitudinally spaced holes 69 through which are journalled the related end portions of ratchet pawl pivot pins 70 which extend between the wings and have heads 71 on their outer ends bearing against the outer sides of the wings, as shown in Figure 8 of the drawings. Journalled on the pins 70 between the wings 60 are similar one-piece ratchet pawls 72, each comprising a flat rectangular plate 72' of a width slightly less than the distance between the wings 60. The plate 72' has stamped or embossed portions providing two laterally spaced semi-cylindrical journal portions 73 projecting above the plate 72' and a single semi-cylindrical journal portion 74 projecting below the plate 72' and positioned between and combining with the portions 73, to form a journal for the pin 70. The spacing of the pivot pins 70 from each other along the wings 60 and the size of the plates 72' can be readily varied to increase or decrease the tooth interference with respect to the ratchet teeth 15 on the operating rod 10.

The upper portion of one side edge of each ratchet pawl 72 is cut away, as indicated at 75, to provide on that side of the plate 72' a space for a positioning spring which has a helical portion 76 circumposed on the pin 70 and extensions 77 and 78 on opposite ends of such helical portion 76. The extension 77 has a lateral arm 79 adapted to be engaged in a notch 80 formed in the upper edge of the adjacent wing 60. The extension 78 bears upon the top of the lug 81 below the cutaway portion 75 at the lower end of the ratchet pawl. The extensions 77 and 78 are oppositely tensioned so that the lower end of the ratchet pawl is tilted downwardly and rearwardly and the effective rear edge 82 of the pawl 72 is depressed into engagement with either a smooth portion of the operating rod 10 or with its ratchet teeth 15. The leverage effective to maintain the lower edges 82 of ratchet pawls 72 depressed may be readily varied, as by locating journal portions 73 and 74 at different distances above lower edges 82.

It will be evident from the foregoing that with the operating rod 10 in the pushed in or forward position shown in the drawings, the automobile brakes are in released condition; and that to apply the brakes and maintain them in applied condition, the handle 11 is pulled rearwardly with the ratchet teeth 15 in the uppermost position shown. This results in engaging ratchet teeth 15 with the effective lower edges 82 of the ratchet pawls, so that upon release of the handle 11 the rod 10 will be maintained by the ratchet pawls in brake applying position.

To release the brakes from applied condition, the handle 11 is rotated so as to rotate the rod 10 and disengage the ratchet teeth 15 from the ratchet pawls 72 and engage the ratchet pawls with the smooth surface of the rod, whereupon the forward pull exerted by the brake springs through brake lever 19 will move the rod 10 forwardly to brake releasing position, unless a rearward pull is maintained by the operator on the handle 11. As soon as the brake handle is released by the operator, torque spring 33 will return the pull rod to the position shown, with its ratchet teeth 15 again in uppermost position, so that the brakes may be applied at will by again pulling handle 11 and the attached pull rod rearwardly.

While the illustrated embodiments are believed to adequately fulfill the objects and advantages herein stated, it is to be understood that modifications and variations may be made within the scope and spirit of the subjoined claim.

Having described my invention, I claim:

In a straight pull brake lever assembly, a pivotally mounted brake lever having a free end, a generally longitudinally movable pull rod having an end portion located in the region of said free end of the brake lever, the said end portion of the pull rod being cylindrical, a connector bracket for connecting the free end of said brake lever to the end of said pull rod, said bracket being formed of sheet metal doubled upon itself to provide spaced apart confronting flanges, the free end of said brake lever being received between and pivotally connected to said flanges, the doubled portion of said bracket being formed cylindrically and receiving the said end of said pull rod, the intermediate portion of the doubled cylindrically formed portion of said bracket having an enlarged opening thereat providing cylindrical journal portions spaced axially of said pull rod, the side of one journal confronting the other journal having a circumferentially extending recess providing circumferentially spaced abutment surfaces at its ends, an abutment on said rod located in said recess, stop means on said rod engageable with said bracket and normally preventing movement of said abutment out of said recess, a coil spring surrounding the portion of said rod intermediate said journal portions and protected by said bracket, said spring having one end engaging said bracket and its other end engaging said abutment to exert torque tending to maintain said abutment in engagement with one abutment surface of said recess.

CHARLES R. DUNCAN.

References Cited in the file of this patent

UNITED STATES PATENTS

| Number | Name | Date |
|---|---|---|
| 416,331 | Githens | Dec. 3, 1889 |
| 1,767,593 | Laabs | June 24, 1930 |
| 2,098,439 | Stuber | Nov. 9, 1937 |
| 2,304,356 | Heller | Dec. 8, 1942 |
| 2,305,225 | Skareen | Dec. 15, 1942 |
| 2,309,636 | Fergueson | Feb. 2, 1943 |
| 2,329,722 | Jandus | Sept. 21, 1943 |
| 2,377,691 | Jandus | June 5, 1945 |
| 2,522,540 | Sandberg | Sept. 19, 1950 |
| 2,543,509 | Sandberg | Feb. 27, 1951 |
| 2,543,510 | Sandberg | Feb. 27, 1951 |
| 2,606,458 | Sandberg | Aug. 12, 1952 |